(12) United States Patent
Zaguroli

(10) Patent No.: US 7,896,573 B2
(45) Date of Patent: Mar. 1, 2011

(54) CLAMPING ASSEMBLY FOR MAKING CONNECTIONS TO ELONGATED MEMBERS

(76) Inventor: James Zaguroli, Auburn Hills, MI (US)

( * ) Notice: Subject to any disclaimer, the term of this patent is extended or adjusted under 35 U.S.C. 154(b) by 249 days.

(21) Appl. No.: 12/075,796

(22) Filed: Mar. 13, 2008

(65) Prior Publication Data
US 2008/0226389 A1    Sep. 18, 2008

Related U.S. Application Data

(60) Provisional application No. 60/894,985, filed on Mar. 15, 2007.

(51) Int. Cl.
*F16B 7/04* (2006.01)
(52) U.S. Cl. ............ 403/400; 403/385; 403/396
(58) Field of Classification Search ............ 403/346, 403/385, 396, 400, 310, 312, 344
See application file for complete search history.

(56) References Cited

U.S. PATENT DOCUMENTS

| | | | | |
|---|---|---|---|---|
| 2,210,465 A | * | 8/1940 | Orsenigo | 403/385 |
| 3,397,431 A | * | 8/1968 | Walker | 403/344 |
| 3,582,029 A | * | 6/1971 | Moesta | 248/68.1 |
| 3,825,358 A | * | 7/1974 | Eisenhardt et al. | 403/385 |
| 3,920,295 A | * | 11/1975 | Speckin | 312/108 |
| 4,032,245 A | * | 6/1977 | Woodruff | 403/385 |
| 4,786,204 A | * | 11/1988 | Mayeda | 403/385 |
| 4,899,963 A | * | 2/1990 | Murphy | 403/400 |

* cited by examiner

*Primary Examiner* — Michael P Ferguson
(74) *Attorney, Agent, or Firm* — John R. Benefiel

(57) ABSTRACT

A connection assembly includes a base structure having a U-shaped piece with turned end walls at each end of a connecting portion with a cut out in each end wall, and a U-shaped cover piece having end walls each with a cut out, the cut outs, of each piece aligned to form an opening receiving an elongated member clamped therein by attachment of said cover pair to the u-shaped piece of the base structure. The base structure can include a second U-shaped piece having a pair of end walls each one end a connecting portion fixed to the first U-shaped piece turned 90° thereto so that the end walls of each lie between each other. A second cover piece with end walls having cut outs aligned with cut outs in the second U-shaped piece end walls may receive a second elongated member in a crossing relationship with the first elongate member. Alternatively, the second cover piece has a second elongated member fixedly projecting from the second cover piece. The second U-shaped piece could also be configured to provide a flat mounting structure for mounting various items to an elongated member.

12 Claims, 4 Drawing Sheets

CLAMPING ASSEMBLY FOR MAKING CONNECTIONS TO ELONGATED MEMBERS

CROSS REFERENCE TO RELATED APPLICATIONS

This application claims the benefit of U.S. provisional application No. 60/894,985 filed on Mar. 15, 2007.

BACKGROUND OF THE INVENTION

This invention concerns making connections to elongated members such as rods, tubes, shafts, etc., such as to other elongated members in a crossing relationship to each other.

Heretofore, machined clamping blocks or saddles have been typically employed to make connections to such members, which are costly to manufacture, are heavy, and require considerable material to make.

It is an object of the present invention to provide a clamping assembly to make connections to elongated members such as to join crossing elongated members together which is inexpensive to fabricate and lightweight while minimizing the amount of materials required to manufacture the same.

SUMMARY OF THE INVENTION

The above recited object as well as other objects which will become apparent upon a reading of the following specification and claims are achieved by a plurality of U-shaped pieces formed from plate metal, which are joined together to form a clamping assembly. Two of the U-shaped pieces are fixed together with end walls or legs of each fit into the spaces between the end wall of the other piece to form a box used as a base structure. The end walls of at least one piece has a pair of cut outs, each formed in a respective end wall. A pair of rectangular sections comprising connecting portions extending between the end walls are turned away from each other to create a clearance space extending between the cutouts which can receive an elongated member passed through the cutouts.

One or more other U-shaped pieces similarly having end walls with matched cutouts are attachable to at least one side of the base structure as with threaded fasteners to function as cover pieces which clamp an elongated member passing through the respective sets of aligned cut outs to the base structure. A pair of cover pieces can be attached to respective opposite sides of the base structure to enable connecting together a pair of elongated members in a crossing relationship.

Alternatively, an elongated member can be welded to a flat plate cover piece assembled to the base structure in which another elongated member clamped to the base structure with a cover piece having matching cutouts. Also, one of the base structure pieces can be flat to provide a mounting surface for attaching other items to an elongated member.

DESCRIPTION OF THE DRAWINGS FIGURES

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1A:
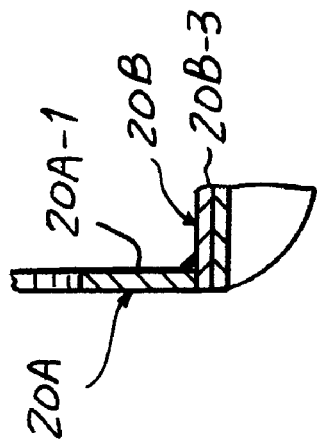
FIGS. 1A and 1B are fragmentary views of the sections A-A and B-B taken in FIG. 1.
Figure 1B:
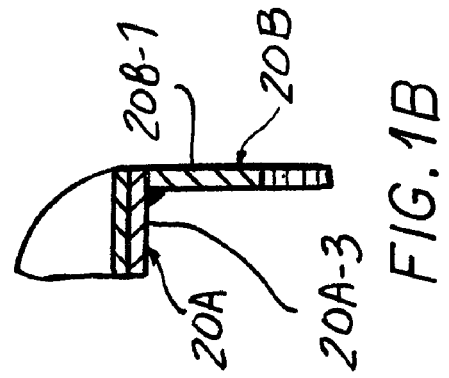
Figure 1:
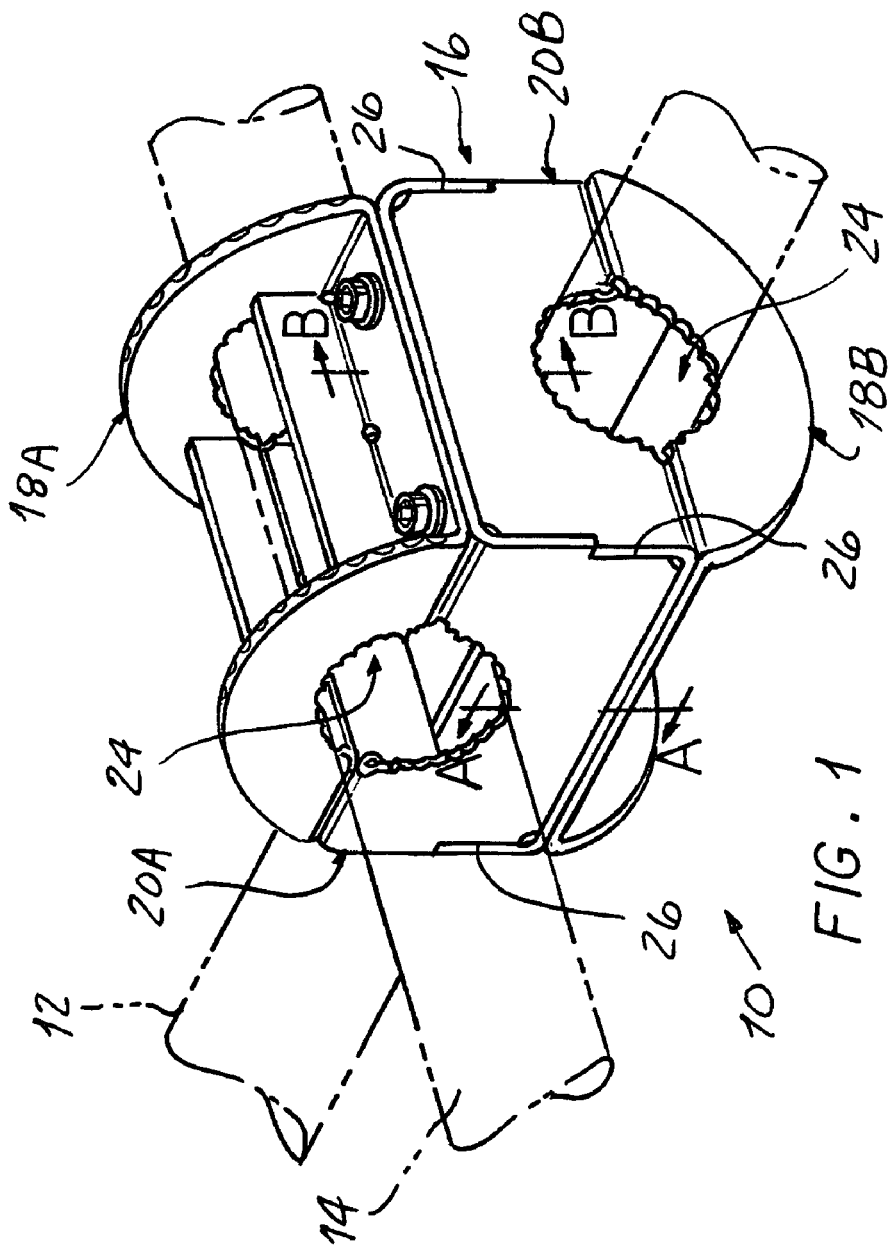
FIG. 1 is a pictorial view of a clamping assembly according to the present invention with crossed and connected elongated members depicted in phantom lines.
Figure 2:
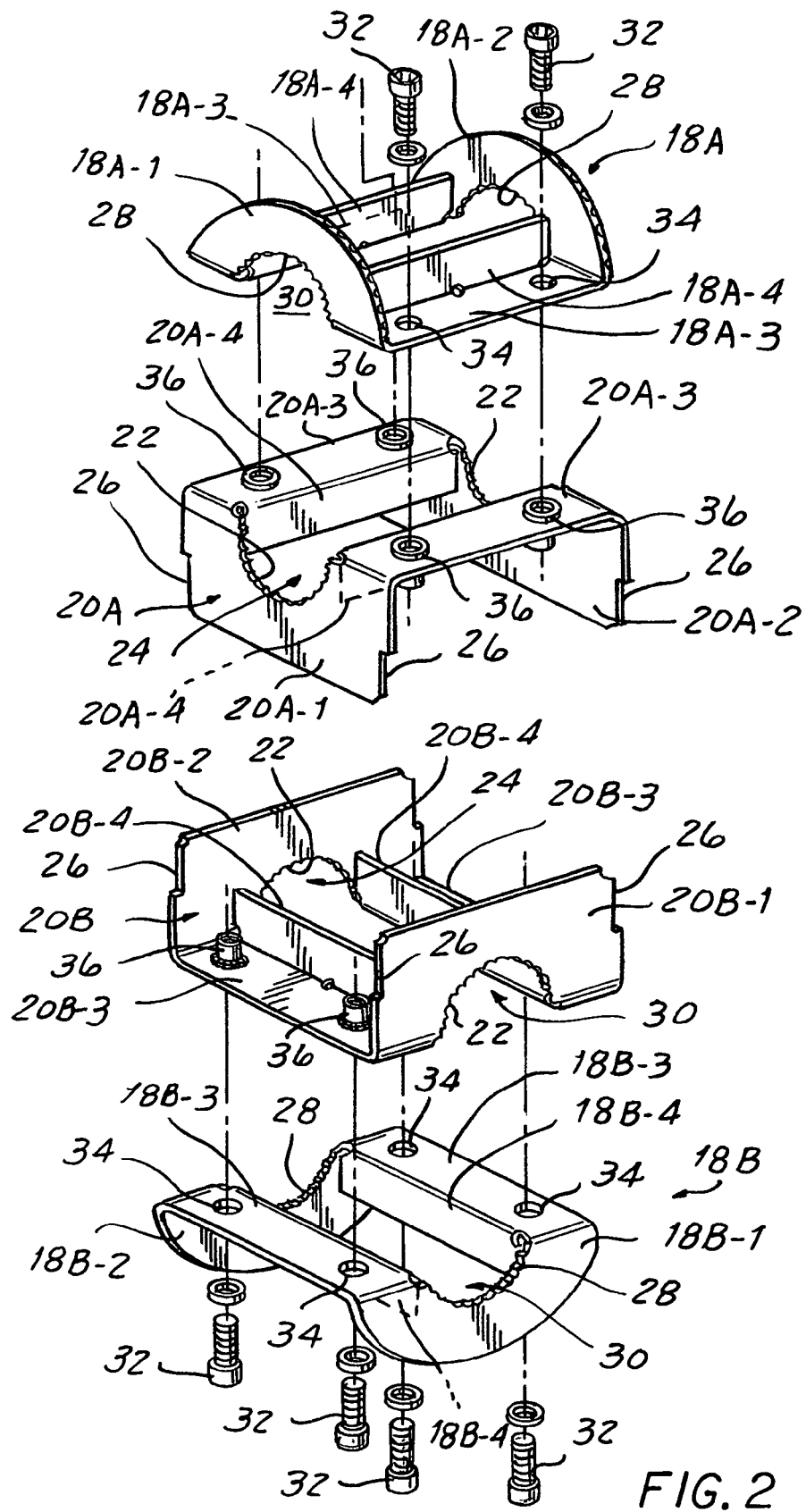
FIG. 2 is an exploded pictorial view of the components of the clamping assembly shown in FIG. 1.

Referring to the drawings and particularly FIG. 1, a clamping assembly 10 according to the present invention is shown which connects together two elongated members here comprising round tubes or shafts 12, 14 in a crossing relationship.

The clamping assembly 10 includes a base structure 16 and a pair of cover pieces 18A, 18B. The base structure 16 is made up of two similar U-shaped base pieces 20A, 20B assembled rotated 90° from each other.

That is, each U-shaped base piece 20A, 20B has a pair of legs or end walls 20A-1, 20A-2 and 20B-1, 20B-2 bent out or turned 90° in the same direction from a respective end of a base plate with remaining, connecting portions 20A-3, 20B-3 extending between the end walls 20A-1, 20A-2, 20B-1, 20B-2. The connecting portions 20A-3, 20B-3 are subdivided by cutting out and bending out two rectangular subsections 20A-4 and 20B-4 from the axis of the aligned cutout 22 in each wall 20A-1, 20A-2, 20B-1 and 20B-2, extending between the walls 20A-1 and 20B-2 and 20B-1, 20B-2, respectively.

Each end wall 20A-1, 20A-2, 20B-1, 20B-2 has a semicircular cutout 22 formed therein extending out from each bend forming the end wall, aligned with each other and with an intervening matched width clearance space 24 created by the bending out of the subsections 20A-4, 20B-4. The perimeter of the cutouts 22 can be serrated as shown to increase the gripping of a clamped shaft 14 extending through the cut outs and space 24.

The pieces 20A, 20B are assembled together turned 90° to each other so that the endwalls 20A-1, 20A-2 are partially received in the space between the endwalls 20B-1, 20B-2 of the other piece.

Notches 26 allow flush interfitting of outer edges of the endwalls as shown in FIG. 1.

After assembly, the pieces 20A, 20B are fixedly connected as by being welded together as shown in FIGS. 1A and 1B along the abutting end edges of the end wall legs 20A-1, 20A-2, 20B-1 and 20B-2 and the abutting outer edges of the connecting portion 20A-3 and 20B-3 of the mating piece 20A, 20B to form the unitary base structure 16.

In the embodiment shown in FIG. 1, a pair of cover pieces 18A, 18B are assembled onto respective opposite sides of the base structure 16 as shown.

The cover pieces 18A, 18B are also each formed of metal cover plates formed with pairs of arcuate end walls 18A-1, 18A-2 and 18B-1, 18B-2 bent out from the ends of the plate in the same direction and having connecting portions 18A-3 and 18B-3 therebetween. The end walls 18A-1, 18A-2 and 18B-1, 18B-3 have semicircular serrated edge cutouts 28 aligned with each other extending out from the bends forming the end walls 18A-1, 18A-2, 18B-1 and 18B-2.

The connecting portions 18A-3, 18B-3 are subdivided by cutting out and forming away from each other pairs of rectangular subsections 18A-4, 18B-4 which creates a clearance opening 30 extending between the pairs of cutouts 28 and of substantially the same width so as to be able to receive the crossed shafts 12 and 14.

The cover pieces 18A, 18B are assembled to a respective base piece 20A, 20B with the respective pairs of end walls extending in opposite directions from each other to align the semicircular cutouts 28 with semicircular cutouts 22, capturing shafts 12 and 14 in the circular openings formed by the combination of the aligned cutouts 28, 22.

Threaded fasteners 32 pass through holes 34 and are threaded into aligned threaded anchors 36 welded to the connecting portions 20A-3, 20B-3 which when tightened securely clamp the shafts 12, 14 by engagement therewith of the serrated edges of the cutouts 22, 28.

Figure 6:
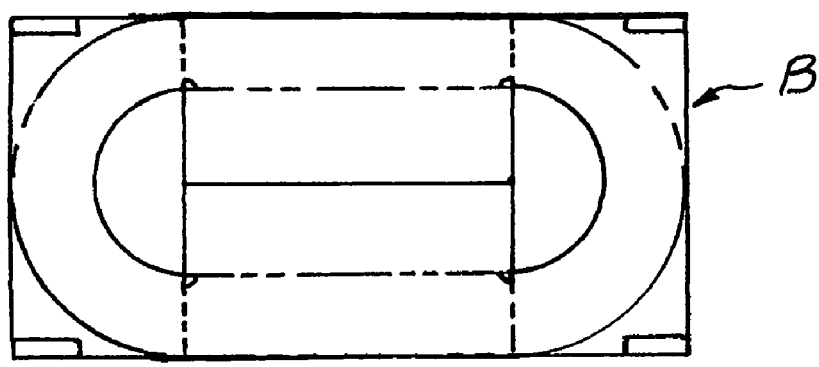
FIG. 6 is a plan view of a blank plate from which the various pieces can be formed.

The cover pieces 18A, 18B and base pieces 20A, 20B can be economically fabricated by simple forming and stamping processes from a blank B shown in FIG. 6. This also allows variations to be easily provided for by changing the size or shape of the cutouts 22, 28.

Figure 3:
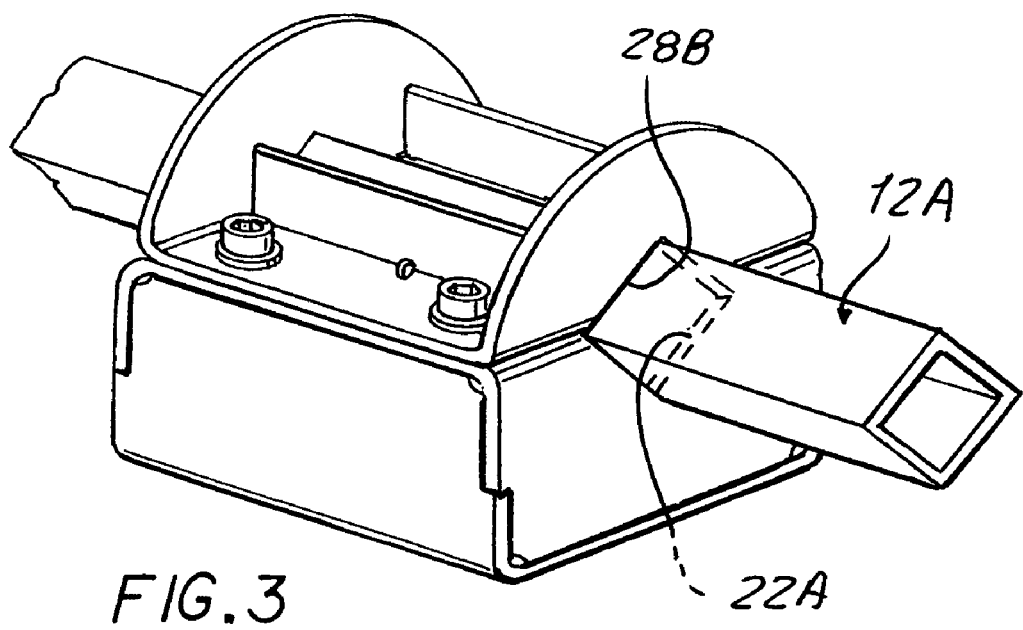
FIG. 3 is a pictorial view of an alternative clamping assembly according to the invention with connected elongated members.

In FIG. 3, the cut outs 22A, 28B can be triangularly shaped to form square or rectangular contours when combined to be able to receive and clamp a square or rectangular tubing or shaft member 12A.

Figure 4:
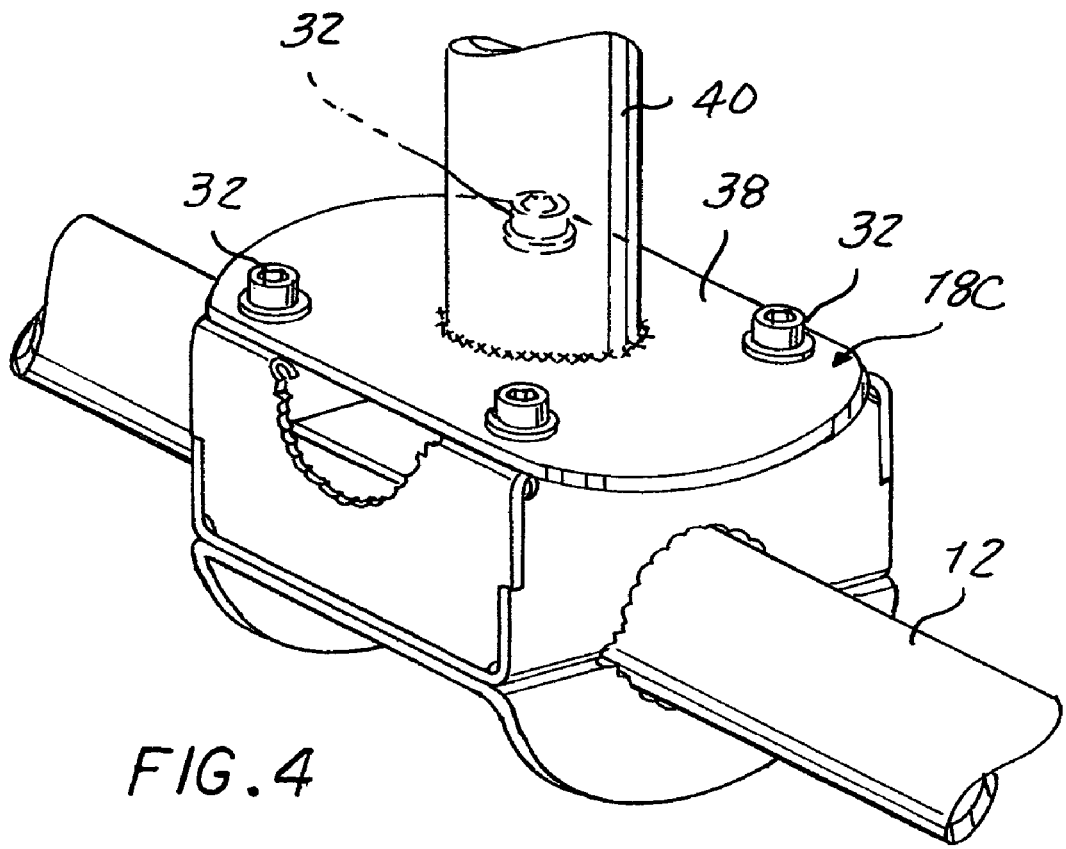
FIG. 4 is a pictorial view of another embodiment of a clamping assembly according to the invention showing a single square tubing connected member.

As shown in FIG. 4, one cover piece can be comprised of a flat plate 38 with a tube member 48 welded thereto, connected to the tube member 12 by attaching the cover piece 18C to the base structure 16 with screws 32. This allows connection to intersecting axis elongated members 12, 40.

Figure 5:
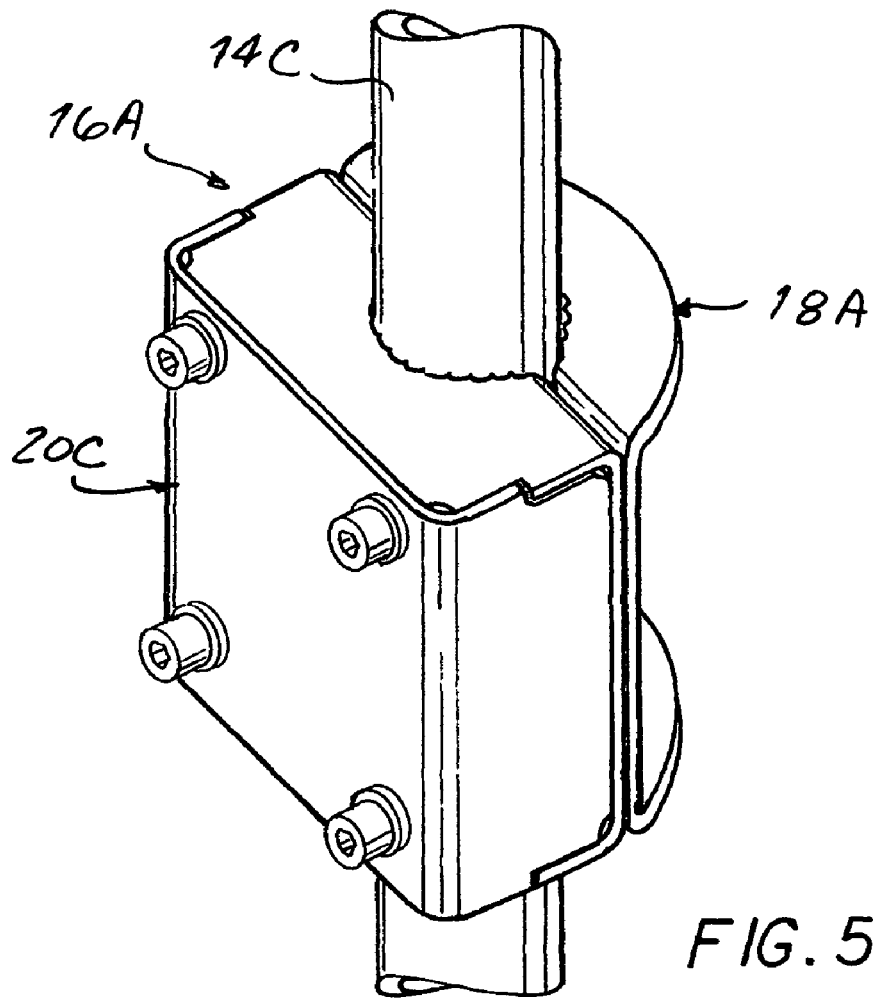
FIG. 5 is a pictorial view of another clamping assembly embodiment of the invention which is used to provide a mounting surface for attaching various items to a single elongated member.

FIG. 5 shows a base structure 16A in which one of the U-shaped base pieces 20C presents a flat surface.

This provides a mounting structure for attaching such items as cables, control or electrical boxes, etc. to an elongated member which is clamped to the base structure 16A with the installation of a cover piece 18A as in the above described embodiments.

The invention claimed is:

1. A connector assembly for connecting to a first elongated member, comprising:
   a first generally U-shaped base piece, said base piece comprising a planar base plate having a pair of aligned end walls each extending out substantially normally in the same direction from a respective end of said base plate with a remaining connecting portion of said base plate extending between said end walls;
   a cutout in each end wall extending out from said remaining connecting portion, said cutouts substantially aligned with each other, said remaining connecting portion of said base plate formed with a slot extending across said base plate between and aligned with said cutouts in said end walls and of at least substantially the same width as said cutouts in said end walls to form a clearance space defined by said aligned cutouts and slot for receiving a first elongated member;
   a first cover piece comprising a planar cover plate having a pair of aligned end walls each extending out substantially normally in the same direction from an attached respective end of said cover plate with a remaining connecting portion of said cover plate extending between said cover piece end walls;
   a cutout in each cover piece plate end wall extending from a respective end of said remaining connecting portion of said cover plate, said cover plate cutouts substantially aligned with each other, said remaining connecting portion of said cover plate formed with a slot extending between and aligned with said cover plate cutouts and of at least substantially the same width as said cover plate cutouts to form a cover piece clearance space defined by said aligned cutouts and slot of said cover plate for receiving the first elongated member;
   said cover piece attached to said U-shaped base piece with said connecting portion of each of said U-shaped base piece base plate and cover piece base plate overlying each other with said respective pairs of end walls of each piece aligned and extending away from each other in opposite directions, and with said respective end wall cutouts substantially aligned together with said slots of said base piece and cover piece together adapted to receive the first elongated member extending therethrough which may thereby be clamped to said connector assembly between said cover piece and said first U-shaped base piece; and
   a second U-shaped base piece comprising a planar base plate having a pair of aligned end walls each extending out substantially normally in the same direction from a respective end of said second base piece base plate, said second U-shaped base piece attached to said first U-shaped base piece such that said second U-shaped base piece base plate extends in a plane parallel to said first U-shaped base piece plate and wherein respective axes longitudinally extending between said respective pairs of aligned end walls of said first and second U-shaped base pieces are rotated 90° relative to each other such that each respective pair of end walls is fit between the pair of end walls of the other U-shaped base piece.

2. The connector assembly according to claim 1 wherein said slot in said first base piece baseplate and in said cover piece cover plate are each formed by pairs of subsections turned out from said respective connecting portions away from an aligned axis of said respective cutouts to create said slots.

3. The connector assembly according to claim 1 wherein said overlying connecting portions of said cover piece and said first U-shaped base piece are attached to each other by threaded fasteners.

4. The connector assembly according to claim 3 further including threaded anchors attached to said connecting portion of said first U-shaped base piece and aligned holes in said cover piece receiving said threaded fasteners which are threadably received in said anchors.

5. The connector assembly according to claim 1 wherein said end walls of said first and second U-shaped base pieces are aligned with each other with said respective remaining portions connecting the end walls of each of the U-shaped base pieces abutted against each other and welded together to produce a unitary base structure.

6. The connector assembly according to claim 1 wherein said second U-shaped base piece end walls have cutouts therein extending out from an attached end of a remaining connecting portion of said second U-shaped base piece base plate and aligned with each other along an axis extending substantially 90° from an axis along which said cutouts in said end walls of said first U-shaped base piece are aligned with a slot in said remaining portion of said second U-shaped base piece extending between and aligned with said cutouts in said second base piece base plate end walls said slot and said cutouts together forming a clearance opening.

7. The connector assembly according to claim 6 further including a second cover piece comprising a planar second cover plate having a pair of aligned end walls each extending out in the same direction from a respective end of said second cover plate and said second cover piece cover plate end walls having respective cutouts extending out from attached ends of said second cover plate substantially aligned with each other and with a slot in said second cover plate together forming a clearance opening, said clearance openings of said second U-shaped base piece and said second cover piece together adapted to receive a second elongated member extending substantially 90° to the first elongated member.

8. The connector assembly according to claim 6 further including a flat cover piece overlying said second U-shaped base piece connecting portion and having an elongated member connected thereto and extending away therefrom.

9. The connector assembly according to claim 1 wherein said aligned cutouts are each at least partially circular and together form an at least partially circular opening.

10. The connector assembly according to claim 1 wherein said cutouts each have a serrated perimeter to enhance gripping of an elongated member.

11. The connector assembly according to claim 1 wherein said cutouts are each formed as a triangle and wherein aligned cutouts of said end walls of said first U-shaped base piece and said first cover piece form a rectangular opening to be complementary to a rectangular in cross section elongated member.

12. The connector assembly according to claim 1 wherein said end walls of said cover piece are arcuately shaped.

* * * * *

UNITED STATES PATENT AND TRADEMARK OFFICE
CERTIFICATE OF CORRECTION

| | | |
|---|---|---|
| PATENT NO. | : 7,896,573 B2 | Page 1 of 1 |
| APPLICATION NO. | : 12/075796 | |
| DATED | : March 1, 2011 | |
| INVENTOR(S) | : James Zaguroli | |

It is certified that error appears in the above-identified patent and that said Letters Patent is hereby corrected as shown below:

Col. 2, line 37, before "wall" insert -- end --
Col. 2, line 38, before "walls" insert -- end --.
Col. 2, line 40, delete "a" and insert -- the --.

Signed and Sealed this
Nineteenth Day of April, 2011

David J. Kappos
*Director of the United States Patent and Trademark Office*